July 13, 1948.   J. R. REYBURN ET AL   2,445,125
LOCK NUT
Filed Feb. 6, 1945

INVENTORS
JOHN R. REYBURN
and LEOPOLD KUHNL
BY
Frederick S. Duncan, ATTORNEY

Patented July 13, 1948

2,445,125

UNITED STATES PATENT OFFICE 2,445,125

LOCK NUT

John R. Reyburn, Fairfield, and Leopold Kuhnl, Stratford, Conn., assignors to American Chain & Cable Company, Inc., Bridgeport, Conn., a corporation of New York Application February 6, 1945, Serial No. 576,423

1 Claim. (Cl. 151—26)

The invention relates to a lock nut which provides a frictional drag upon the bolt or stud received therein to prevent unloosening of the nut such as may occur under the influence of vibration or other causes. The nut is so constructed that the nut may be threaded upon and removed from the bolt without difficulty and in the usual manner with a standard wrench.

It is an object of the invention to construct a new and novel frictional drag lock nut.

Another object of the invention is to construct a lock nut having a recess therein to receive a resilient means in the form of a bar or rod which is engaged by the bolt or stud and is flexed thereby when the bolt is inserted within the nut to create sufficient frictional drag between the resilient means and the bolt so that the nut will not unloosen under normal use.

Another object is to provide several ways in which the flexing of the resilient means is attained.

A still further object is to provide several forms of resilient means for obtaining the frictional drag.

Other objects of the invention will be more apparent from the following description taken in connection with the accompanying drawings illustrating several embodiments of the invention in which.

The lock nut to be described herein is of the type which creates a frictional drag upon the bolt or stud or between the bolt and the nut so that the lock nut will not be unloosened under normal use such as might occur when a bolt and nut are subjected to vibration. The construction is applicable to a threaded hole in any part of a structure which threaded hole in a broad sense is a nut. This frictional drag is obtained from a spring element or resilient means carried by the nut and engaging the bolt so that the frictional drag created is that between the threads of the bolt and the threads of the nut occasioned by the resilient means pressing the nut against the threads of the bolt, and as a consequence of the direct contact of the resilient means engaging the thread of the bolt.

The lock nut includes a nut body 10 having a threaded hole 11 to receive a threaded bolt or stud B. In the construction illustrated particularly in Figure 1, a recess 12 is provided in the nut body which recess is preferably a hole of circular cross section. This recess or hole intersects the threaded hole 11 so that a resilient means 13, which is retained in the hole, will be engaged by the threads of the bolt and flexed thereby to create a frictional drag which resists unloosening of the nut. The resilient means may be initially straight or unflexed or may be flexed. An initially flexed resilient means may be accomplished by making an angular recess or hole as illustrated and inserting a straight resilient means or the hole may be straight and the resilient means is initially bent which is bent towards straightened condition when engaged by the bolt.

Figure 1:
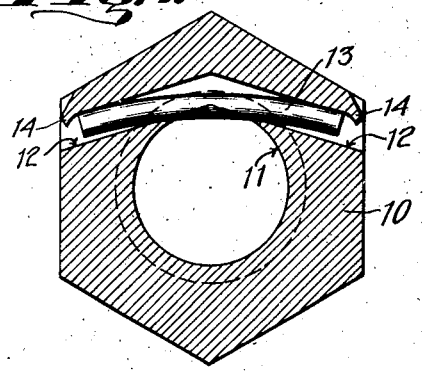
Figure 1 is a cross section through the lock nut showing the resilient means carried in a hole in the nut body.
Figure 2:
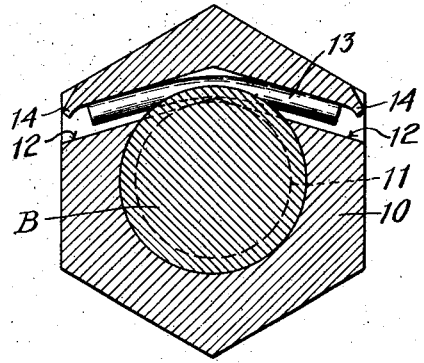
Figure 2 is a cross section through the lock nut of Figure 1 with a bolt threaded therein and flexing or bending the resilient means.
Figure 3:
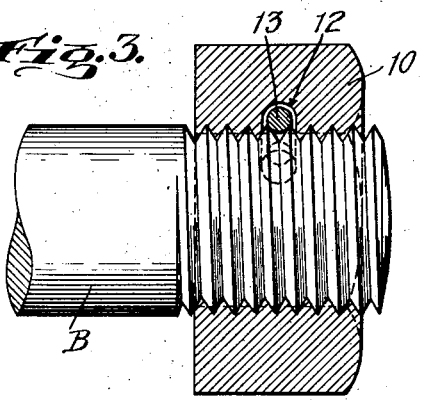
Figure 3 is a longitudinal section through the lock nut with a bolt threaded therethrough and flexing the resilient means.

In Figure 1, the recess or hole 12 shown is formed by drilling two angularly disposed holes from opposite faces of the nut which hole intersects the bolt hole 11. With a resilient means which is intended to engage in the thread groove of the bolt, the hole is positioned so that the resilient means engages in the bolt thread groove.

With this form of hole the resilient means or pin or rod 13 may be straight so that it is flexed when positioned within the angular hole and overlaps or is projected into the bolt hole 12 sufficiently so that when the nut is threaded upon the bolt, the pin or rod which forms the resilient means 13 is further flexed. This provides considerable frictional drag between the bolt yet it does not prevent the nut from being readily threaded on the bolt. It is clear that increased flexure may be obtained by increasing the angle of incidence of the holes 12, by increasing the size of the resilient means 13 or by selecting a different form of bar or rod. The hole 12 is somewhat larger than the rod or bar means 13 received therein so that the latter may flex freely when the unit is threaded on the bolt.

Means may be provided to permanently retain or at least to prevent inadvertent removal of the resilient means within the recess or hole 12. The simplest way of accomplishing this when a hole 12 is provided, is to offset a portion of the edge of the hole so that a projection 14 is formed which prevents removal of the pin 13. The hole 12 is of sufficient size also so that the resilient rod means may adjust itself somewhat in an axial direction and engage the bolt B within a thread groove.

Figure 4:
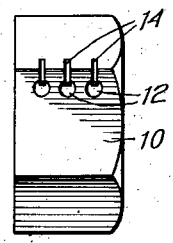
Figure 4 is a side view of a lock nut showing a plurality of recesses or holes therethrough each of which may receive a resilient means.

A plurality of such resilient means may be provided within the nut. Figure 4 shows three such holes or recesses each of which may receive a resilient means. It is clear that the rods or bars may be provided upon one side only as illustrated or may be on opposite sides or may be distributed around the circumference of the threaded hole 11 of the nut.

Figure 5:
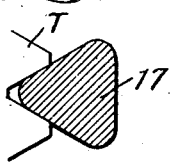
Figure 5 is a cross section through a resilient means of triangular shape and engaging a thread groove.
Figure 7:
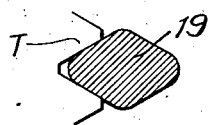
Figure 7 is another view showing a portion of a thread and a resilient means having a diamond shape cross section.
Figure 9:
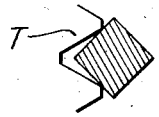
Figure 9 shows a resilient means of square cross section with the corner of the rod extending into a thread groove.

The resilient means may be of various forms and there is shown in Figure 5 a triangular shaped rod or bar 17 which is so positioned in the hole that the angular corner or point thereof engages within the thread groove of the bolt and affords additional contact between the flanks of the thread on the bolt and the resilient means and in this way provides additional frictional drag between the bolt and nut. Furthermore the increased cross section of this form of bar or rod as well as the shape of the cross section results in an increased power or stiffness which further increases the frictional drag. A similar result may be obtained with the diamond-shaped resilient means 19 illustrated in Figure 7. The square rod or bar illustrated in Figure 9 produces a somewhat different frictional effect, because of its engagement with the thread at the outer ends thereof.

Figure 6:
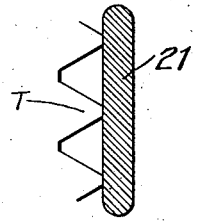
Figure 6 is a cross section showing a portion of a thread and a resilient means of flat or plate form engaging the threads.
Figure 8:
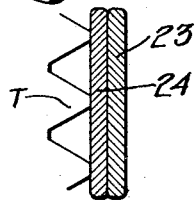
Figure 8 shows a portion of a thread with a resilient means of plate form and of laminated construction.

It is not essential that the resilient means engage within the thread groove of the bolt. It may if desired engage the peak or top of the thread as illustrated in the constructions of Figures 6 and 8. The resilient means of Figure 6 in the form of a bar 21 is wide enough to engage the peaks of three threads. It may engage more or less threads depending upon the width thereof.

Figure 10:
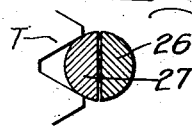
Figure 10 shows a resilient means of laminated construction and having a cylindrical cross section.

In the construction of Figure 8 the resilient means is made up of laminated sections 23 and 24. If desired also the resilient means of other cross sections may be a laminated element as illustrated in the circular resilient means of Figure 10 which may be made up of half-round sections 26 and 27. Such laminated resilient means need not be secured together.

This invention is presented to fill a need for improvements in a locking means or nut. It is understood that various modifications in structure, as well as changes in mode of operation, assembly and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

A lock nut for a bolt comprising a nut body having a tapped hole therethrough, a transverse hole extending into the nut body and intersecting the tapped hole, said transverse hole being bent in configuration, an elongated resilient member received within the transverse hole and deformed by the walls of the hole, said member upon engagement with the threads of a bolt in the tapped hole being further deformed in the same direction as the deformation caused by the walls of the hole, and means retaining said member in said hole.

JOHN R. REYBURN.
LEOPOLD KUHNL.

REFERENCES CITED

The following references are of record in the file of this patent:

UNITED STATES PATENTS

| Number | Name | Date |
| --- | --- | --- |
| 289,430 | Maxwell | Dec. 4, 1883 |
| 541,527 | Fleming | June 25, 1895 |
| 853,661 | Walbrecker | May 14, 1907 |
| 1,010,207 | Wildman | Nov. 28, 1911 |
| 1,909,400 | Hall | May 16, 1933 |
| 2,107,550 | Schmidt | Feb. 8, 1938 |
| 2,275,993 | Robertson | Mar. 10, 1942 |
| 2,339,130 | Albin | Jan. 11, 1944 |
| 2,372,884 | Davis | Apr. 3, 1945 |
| 2,381,206 | Clayson | Aug. 7, 1945 |

FOREIGN PATENTS

| Number | Country | Date |
| --- | --- | --- |
| 184,245 | Great Britain | Aug. 3, 1922 |
| 553,901 | Great Britain | June 9, 1943 |